US009791010B2

(12) United States Patent
Soncina

(10) Patent No.: US 9,791,010 B2
(45) Date of Patent: Oct. 17, 2017

(54) TRANSMISSION UNIT FOR INDUSTRIAL MACHINES

(71) Applicant: OMSI TRASMISSIONI S.P.A., Brescia-Roe Volciano (IT)

(72) Inventor: Renato Soncina, Brescia (IT)

(73) Assignee: OMSI TRASMISSIONI S.P.A., Roe Volciano, Brescia (IT)

( * ) Notice: Subject to any disclaimer, the term of this patent is extended or adjusted under 35 U.S.C. 154(b) by 2 days.

(21) Appl. No.: 14/533,309

(22) Filed: Nov. 5, 2014

(65) Prior Publication Data

US 2015/0129386 A1 May 14, 2015

(30) Foreign Application Priority Data

Nov. 8, 2013 (IT) ................ BS2013A0161

(51) Int. Cl.
*F16D 67/02* (2006.01)
*F16D 67/04* (2006.01)
*F16H 47/02* (2006.01)

(52) U.S. Cl.
CPC ............. *F16D 67/04* (2013.01); *F16H 47/02* (2013.01)

(58) Field of Classification Search
CPC ........ F16D 67/04; F16D 63/006; F16D 67/02; A01D 2034/6843; A01D 2101/00; A01D 34/66; A01D 34/6806; B60K 23/00; B60T 11/04; B60T 7/02; B60T 7/104; B60W 10/04; B60W 10/103; B62D 11/08; B62D 11/183; F16H 47/02; F16H 61/4157; F16H 61/42; F16H 63/18; F16H 63/48; F16H 7/0827; F16H 9/14; F16H 61/30; F16H 2061/307; F16H 2047/025

See application file for complete search history.

(56) References Cited

U.S. PATENT DOCUMENTS 6,393,944 B1 * 5/2002 Soncina ................ B60K 17/28
                                                       74/15.88
6,536,560 B1 * 3/2003 DeWald ................ F16D 55/40
                                                       188/18 A
7,350,630 B1 * 4/2008 Hauser ................... F16D 67/02
                                                       192/13 R (Continued)

FOREIGN PATENT DOCUMENTS

EP            1887253       2/2008
EP            2503187       3/2011

*Primary Examiner* — Ramya Burgess
*Assistant Examiner* — Lillian Nguyen
(74) *Attorney, Agent, or Firm* — Thomas Horstemeyer LLP

(57) ABSTRACT

A stepless speed variation transmission drive unit, in particular for industrial, agricultural or railway machinery, comprises at least a first input pinion (10), at least a first hydraulic motor (12) connected to said first input pinion (10), an output shaft (30), and at least a second hydraulic motor (22, 23). The first hydraulic motor (12) is connectable and disconnectable to/from said output shaft (30) by means of a clutch (50), while the second hydraulic motor (22, 23) is adapted to transmit the movement directly to the output shaft (30). The transmission drive unit further comprises a brake device (70) adapted to block the rotation of the first hydraulic motor (12) when said first hydraulic motor (12) is disconnected from the output shaft (30).

17 Claims, 4 Drawing Sheets

(56) References Cited

U.S. PATENT DOCUMENTS

| | | | |
|---|---|---|---|
| 2009/0090103 A1* | 4/2009 | Yabuuchi | F04B 23/06 |
| | | | 60/489 |
| 2011/0024208 A1* | 2/2011 | Wust | B60K 6/26 |
| | | | 180/65.22 |
| 2014/0007739 A1* | 1/2014 | Schnabel | F16H 47/02 |
| | | | 74/661 |

* cited by examiner

TRANSMISSION UNIT FOR INDUSTRIAL MACHINES

The present invention relates to a stepless speed variation transmission drive unit, in particular for applications on agricultural, industrial or railway machinery.

This transmission drive unit allows the machinery to cover a wide range of speeds, without having to change gear. In other words it ensures, without discontinuity, the achievement of a high driving torque at low speeds, and high output speeds when the driving torque required is not high.

In various known prior art embodiments, the transmission drive unit comprises at least one input pinion, an intermediate shaft and an output shaft, which can be connected by means of universal joints, or directly, to one or two further transmission members (such as axles).

Two or more hydraulic motors may be connected to the unit; of them, at least one motor transmits the movement directly to the output shaft and is therefore always connected, and at least one motor is connectable to and disconnectable from the output shaft by means of a clutch, for example a multi-disc clutch, operated by a piston.

Thanks to the presence of the clutch, it is possible to disengage the hydraulic motor, which can therefore be operated at low speeds to supply more torque, and can be disconnected at higher speeds when the torque of such a motor is no longer required.

However, such a drive transmission unit has the drawback that when the clutch is released to disengage the motor from the output shaft, the disconnected motor can still continue by inertia to be driven in rotation, resulting in power absorption and decay of the efficiency of the transmission or, worse, with the risk of a consequent damage thereof (if, due to the drive, it rotates at speeds higher than those allowed by the manufacturer thereof).

According to the prior art, an embodiment variant is known which aims to eliminate such a drawback by combining a brake to the disengagement device of one of the hydraulic motors, in order to prevent the hydraulic motor from being driven in rotation once disconnected.

However, also this embodiment variant has technical limitations, which may affect the actual successful use thereof in applications with rather high installed power.

In particular, such an embodiment variant provides that both the engagement/disengagement device of one of the hydraulic motors, and the corresponding brake, are made by means of conical synchronisers with any subsequent additional tooth coupling, if it is necessary to transmit high torques.

However, conical synchronisers are characterised by limited energy absorption capacity, limited thermal capacity and consequently limited ability to synchronise high speed differences or allow repeated connections under load. Sometimes, in order not to burn, they require an additional synchronisation of the speeds, obtained by suitably controlling the variation of the displacement of the hydraulic motors, and which involves a complication in the control electronics of the system.

Finally, to control the clutch-brake system, the embodiment variant based on conical synchronisers explicitly provides for the use of a dedicated external actuator, with a spring system, which is necessary to control a gradual insertion of the synchronisers themselves.

The object of the present invention is to provide a transmission drive unit of the above type, but free from said drawbacks, and at the same time highly reliable and compact in size.

Said objects are achieved with a transmission drive unit according to claim 1. The dependent claims describe preferred embodiments of the invention.

According to claim 1, the transmission drive unit according to the invention comprises at least a first input pinion, at least a first hydraulic motor connected to said first input pinion, an output shaft, and at least a second hydraulic motor. The first hydraulic motor is connectable to and disconnectable from said output shaft by means of a multi-disc clutch, while the second hydraulic motor is adapted to transmit the movement directly to the output shaft.

The transmission drive unit further comprises a multi-disc brake device adapted to block the rotation of the first hydraulic motor when said first hydraulic motor is disconnected from the output shaft.

Therefore, the hydraulic motor (or hydraulic motors, if more than one) that is disconnected, is then braked to exclude the possibility that it is driven in rotation, with consequent worsening of the efficiency of the transmission and possibility of damage to the motor itself.

The use of a multi-disc clutch and a multi-disc brake (characterised by high thermal capacity), in place of conical synchronisers, allows significantly increasing the ability of connection under load, and also allows a reduction of the time interval required for the connection (since the synchronisation of speeds is much faster and more accurate), and prevents the need of a dedicated control electronics for controlling the displacements of the hydraulic motors.

In an advantageous embodiment, the first input pinion is adapted to transmit the movement to the output shaft by means of an intermediate shaft, the multi-disc clutch being adapted to connect and disconnect said intermediate shaft to/from the output shaft.

Advantageously, the brake device acts on the rotation of the intermediate shaft.

Advantageously, moreover, the clutch and the brake device are operated by a same clutch-brake actuator. In one embodiment, such a clutch-brake actuator is integrated within the transmission drive unit.

In one embodiment, at least one second hydraulic motor is connected to a second input pinion adapted to transmit the movement directly to the output shaft.

The features and the advantages of the transmission drive unit according to the invention shall be made readily apparent from the following description of preferred embodiments thereof, provided purely by way of a non limiting example, with reference to the accompanying figures, in which.

Figure 1:
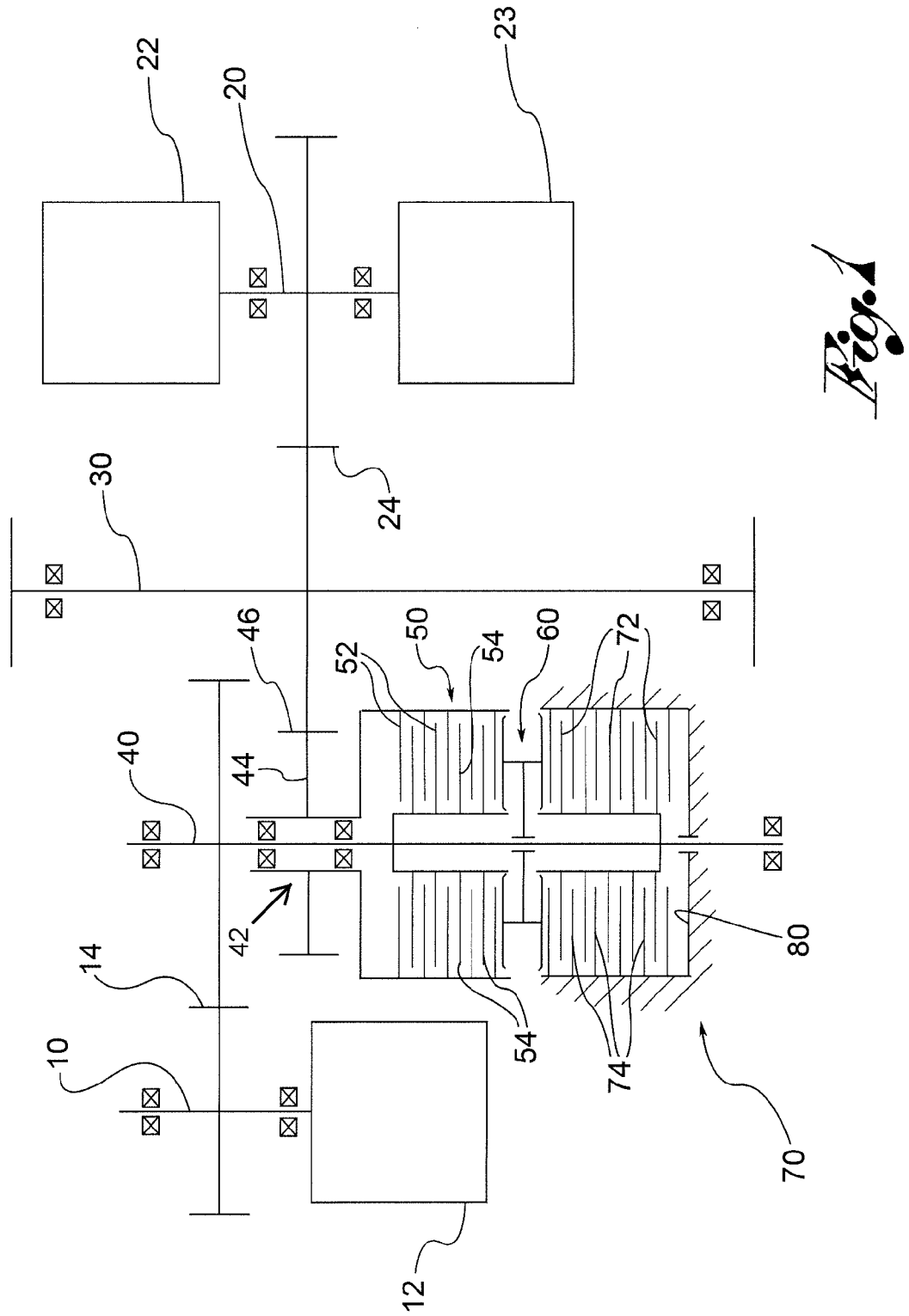
FIG. 1 is a diagram of a transmission drive unit according to the invention, in a preferred embodiment.

In a preferred embodiment shown in FIG. 1 the transmission drive unit, indicated as a whole with reference numeral 1, comprises at least a first input pinion 10, a second input pinion 20, an output shaft 30 and an intermediate shaft 40 between said first input pinion 10 and said output shaft 30.

The output shaft 30 can be connected by universal joints, or directly, to one or two further drive members, such as axles.

The first input pinion 10 is connected to at least a first hydraulic motor 12. The second input pinion 20 is connected to one or more hydraulic motors 22, 23. In an alternative embodiment, said second hydraulic motors may be directly connected to the intermediate shaft 40 or directly connected to the output shaft 30, so that the second input pinion 20 and possibly also the intermediate shaft 40 may also be not needed.

Going back to the preferred embodiment in FIG. 1, the first input pinion 10 transmits the movement to the output shaft 30 through the intermediate shaft 40.

In one embodiment, the first input pinion 10 is adapted to transmit the movement to the intermediate shaft 40 by means of a first toothed gear 14. The second input pinion 20 is adapted to transmit the movement directly to the output shaft 30, for example by means of a second toothed gear 24, and is therefore always engaged.

In one embodiment, the intermediate shaft 40 supports, for example by means of a bearing system 42, an intermediate gear 44 rotatably connected to the intermediate shaft, for example by means of a third toothed gear 46.

The intermediate shaft 40 is connectable to and disconnectable from the output shaft 30 by means of a multi-disc clutch 50.

In a preferred embodiment, clutch 50 is a multi-disc clutch comprising a pack of discs 52 coated with friction material interposed to a pack of metal counter-discs 54. The pack of discs 52 is operatively connected in rotation, for example via the intermediate gear 44 and the third toothed gear 46, to the output shaft 30; the pack of counter-discs 54 is integral with the intermediate shaft 40, or vice versa. For example, the pack of discs 52 is radially constrained to the intermediate gear 44, while the pack of counter-discs 54 is radially constrained to the intermediate shaft 40.

When the two packs of discs and counter-discs 52, 54 are pressed against each other, the resulting friction makes the intermediate gear 44 integral to the intermediate shaft 40, so that the driving torque from the first pinion 10 can be transmitted to the output shaft 30 by means of the third toothed gear 46. When instead the packs of discs and counter-discs 52, 54 are not placed in mutual compression, the intermediate gear 44 can rotate freely with respect to the intermediate shaft 40, being supported by the bearing system 42, and therefore allows disconnecting both the intermediate shaft 40 and the first input pinion 10 from the output shaft 30.

In a preferred embodiment, the multi-disc clutch 50 is controlled by a clutch actuator 60 operable to make the pack of discs 52 integral to the pack of counter-discs 54.

In one embodiment, the clutch actuator 60 is made with a piston-cylinder system 401, 402, pneumatically, hydraulically or mechanically operated.

Figure 2:
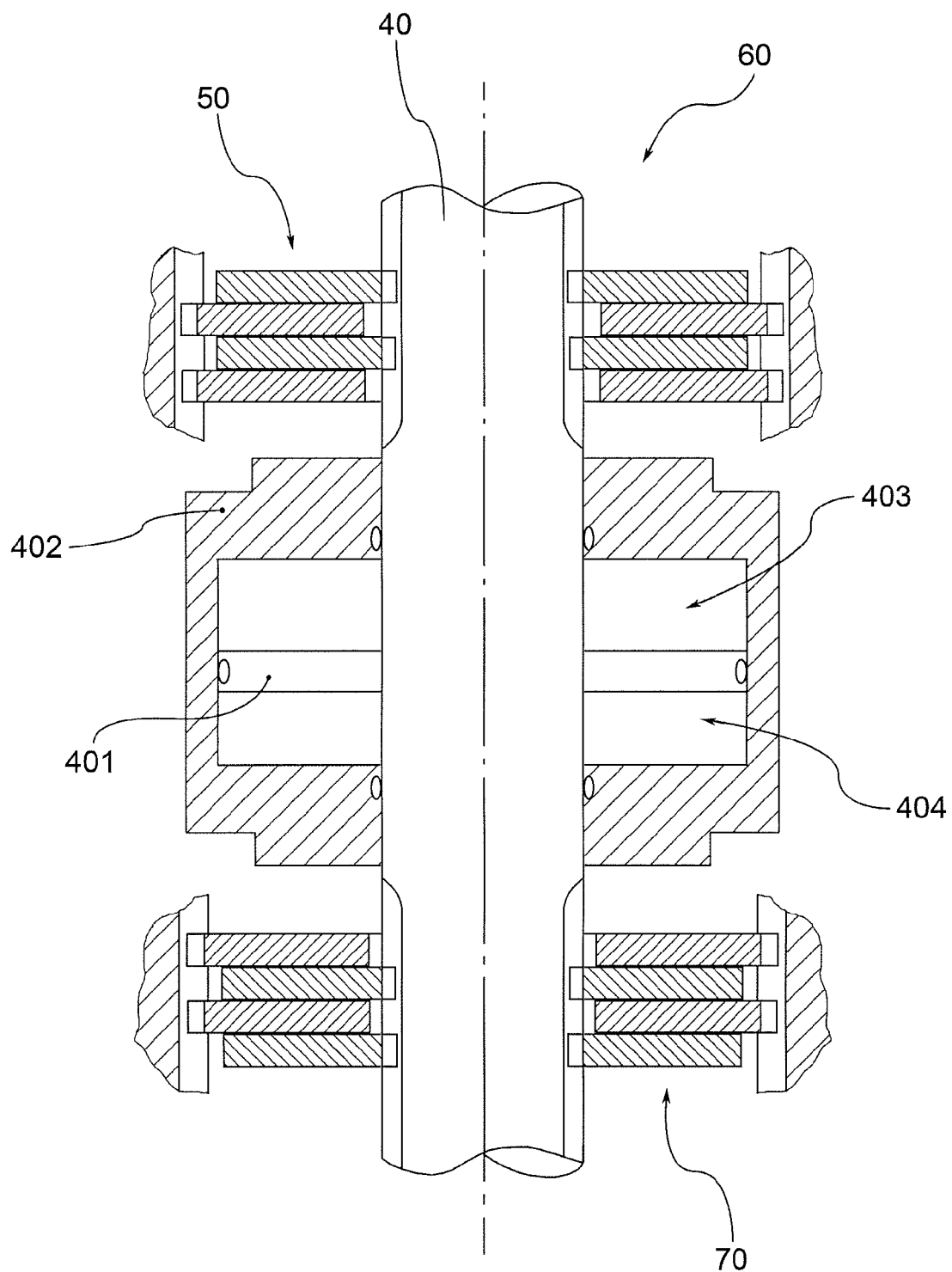
FIG. 2 shows a sectional view of an exemplary embodiment of a clutch-brake actuator for the transmission drive unit in FIG. 1.

More in detail, and with reference to FIG. 2, the piston consists of a flange 401 made on the intermediate shaft 40, and cylinder 402 is sealingly assembled around said flange 401 so as to define with said flange 401 a front cylinder chamber 403 and a rear cylinder chamber 404. Said front 403 and rear chambers 404 are alternately supplied by a pressurised fluid so as to control cylinder 402 to translate axially between an advanced compression position of the packs of discs 52 and counter-discs 54 and a rearward disengaged position of discs 52 from the counter-discs 54. For example, the pressurised fluid is supplied to the cylinder chambers through air passage or oil passage holes made in the intermediate shaft 40.

According to a general aspect of the invention, the transmission drive unit 1 further comprises a multi-disc brake device 70 adapted to block the rotation of the first hydraulic motor 12 when it is disconnected from the output shaft 30.

In the example shown, the brake device 70 stops the rotation of the first input pinion 10, preferably by acting on the rotation of the intermediate shaft 40.

In a preferred embodiment shown in FIGS. 1 and 2, the multi-disc clutch 50 and the multi-disc brake device are operated by a same clutch-brake actuator 60, preferably integrated in the transmission drive unit. More in detail, said clutch-brake actuator is movable between a first brake position, in which it operates the brake device 70 and is simultaneously disengaged from clutch 50, and a second clutch position, in which it releases the brake device 70 and simultaneously operates clutch 50 to connect in rotation the intermediate shaft 40 to the output pinion 30.

Preferably, therefore, the multi-disc brake device 70 acts on the rotation of the intermediate shaft 40.

For example, the multi-disc brake device 70 is operated by the cylinder of the clutch actuator 60.

More in detail, the multi-disc brake device 70 comprises a pack of brake discs 74 coated with friction material, interposed to a pack of metal brake counter-discs 72. The brake discs 74 are pressed against the brake counter-discs 72 by the cylinder of the clutch actuator 60 when said cylinder is in the rearward position.

In one embodiment, the pack of brake counter-discs 72 is radially integral with the intermediate shaft 40, while the pack of brake discs 74 is radially integral to a static part of the transmission drive unit, such as a casing 80, or vice versa.

Therefore, when clutch 50 is opened, the brake counter-discs 72 and the brake discs 74 are pressed against each other by the clutch-brake actuator 60, and the resulting friction allows making the static part 80 of the transmission drive unit and the intermediate shaft 40 integral to each other.

Consequently, the intermediate shaft 40 is stationary during the rotation of the output shaft 30, and the first input pinion 10, as well as the hydraulic motor 12 constrained thereto are also stationary. In other words, it becomes impossible for the hydraulic motor 12 to be unintentionally driven in rotation when disconnected.

Advantageously, the fact that the first hydraulic motor 12 connected to the first pinion 10 is not driven in rotation when disconnected allows preventing a power absorption thereof (which, although limited, would deteriorate the efficiency of the transmission) and preventing the motor, driven in high-speed rotation, from being damaged.

Figure 3:
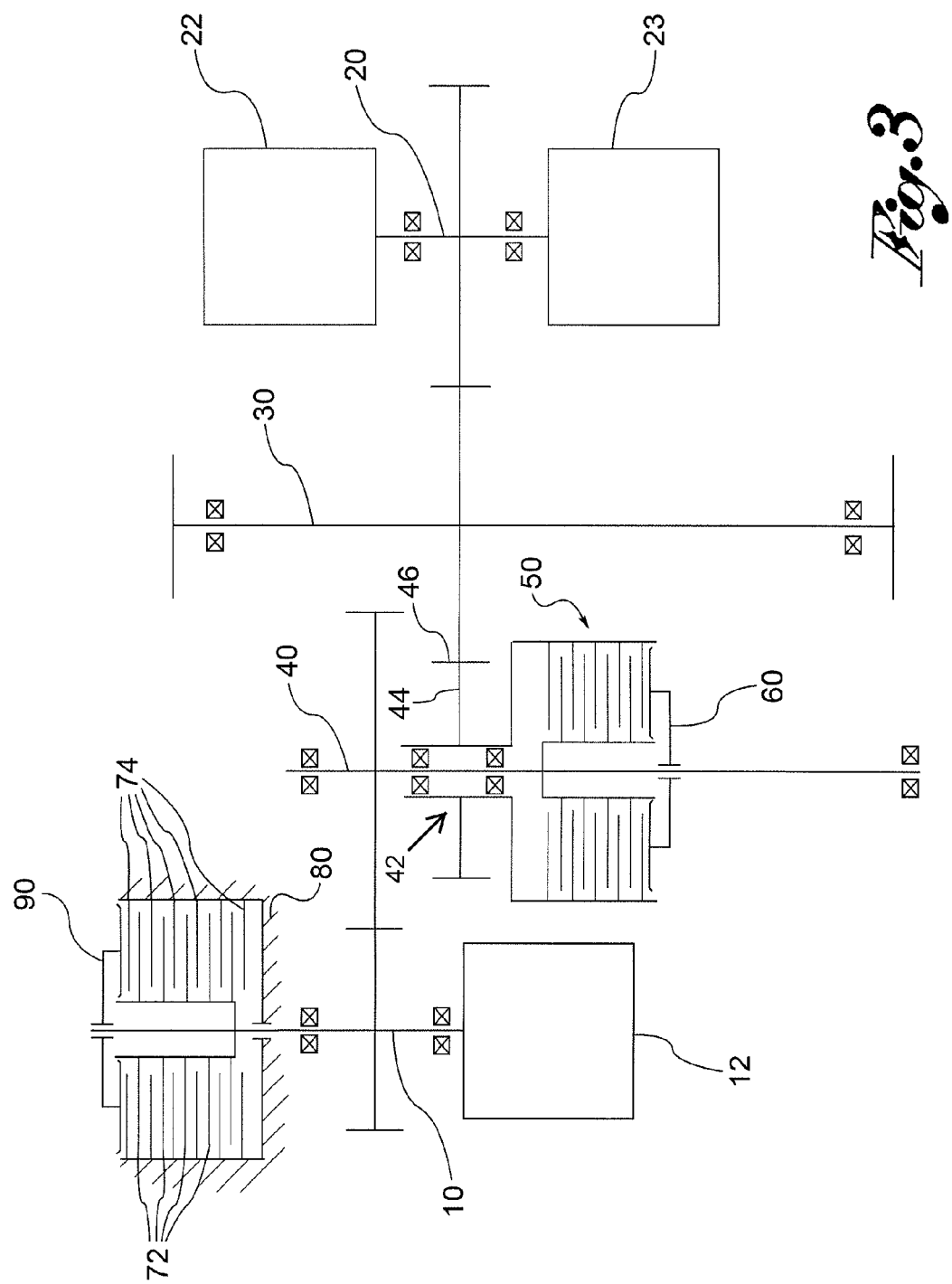
FIG. 3 is a diagram of a transmission drive unit according to the invention, in an embodiment variant.

In an embodiment variant shown in FIG. 3, where elements common to those described with reference to FIG. 1 are indicated by the same reference numerals, the multi-disc brake device 70 can be applied to the first input pinion 10, rather than to the intermediate shaft 40.

For example, the pack of brake counter-discs 72 can be radially constrained to the first pinion 10, while the pack of brake discs 74 can be radially constrained to a static part 80 of the transmission drive unit, such as the casing.

In this embodiment, the brake device 70 can be operated by its own brake actuator 90.

Figure 4:
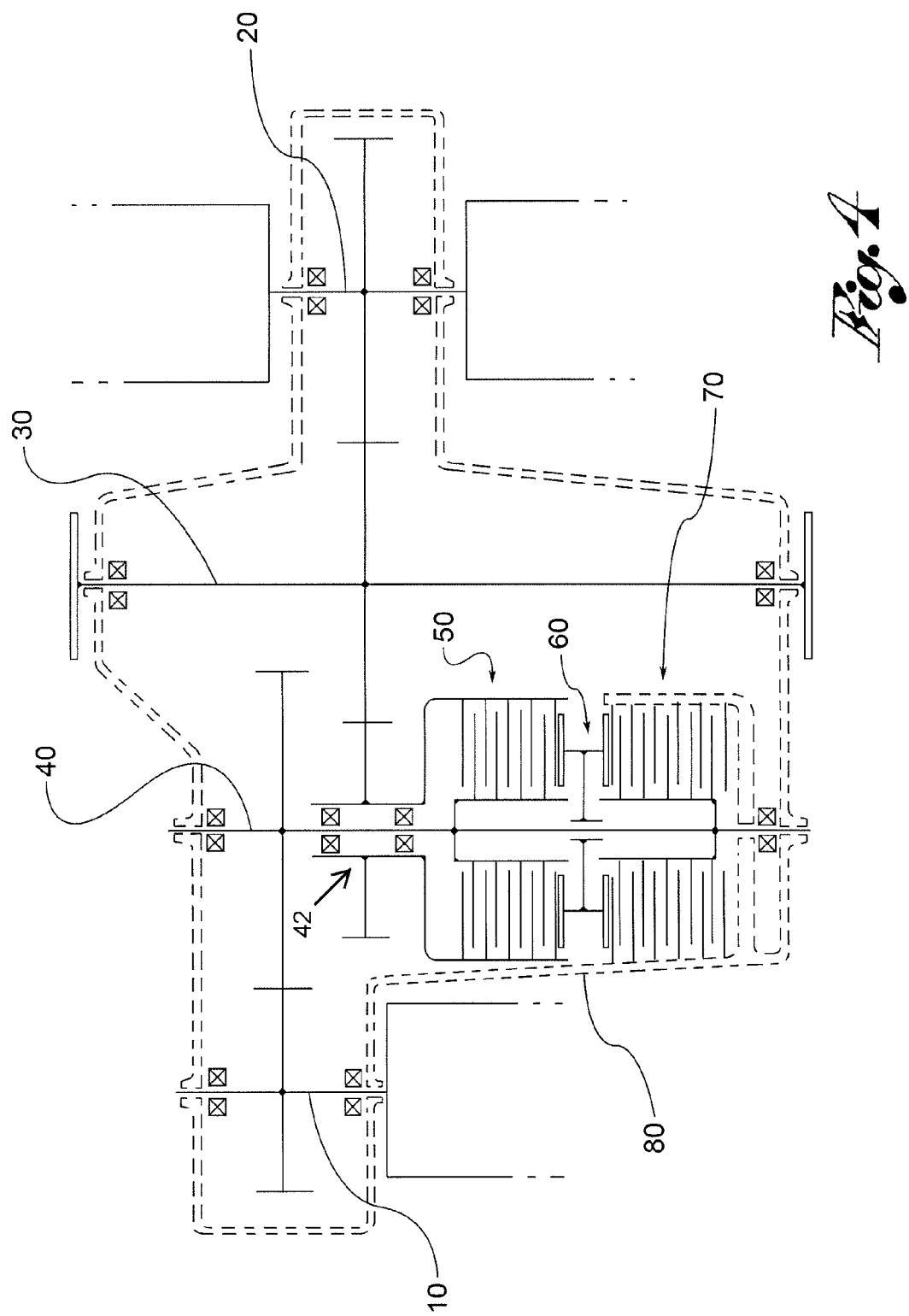
FIG. 4 schematically shows the transmission drive unit in FIGS. 1 and 2 including a containment and support casing of the functional components of the group.

In a preferred embodiment shown in FIG. 4, the transmission drive unit comprises a containment and support casing 80 containing and supporting at least the first input pinion 10, the output shaft 30, the multi-disc clutch 50, the multi-disc brake 70, the brake-clutch actuator 60 and, if present, the intermediate shaft 40 and the second input pinion 20. Advantageously, therefore, the brake-clutch actuator 60 is housed inside casing 80 of the transmission drive unit.

A man skilled in the art may make several changes, adjustments, adaptations and replacements of elements with other functionally equivalent ones to the embodiments of the transmission drive unit according to the invention in order to meet incidental needs, without departing from the scope of the following claims. Each of the features described as belonging to a possible embodiment can be obtained independently of the other embodiments described.

The invention claimed is:

1. A stepless speed variation transmission drive unit, in particular for industrial, agricultural or railway machinery, comprising at least a first input pinion, at least a first hydraulic motor connected to said first input pinion, an output shaft, and at least one second hydraulic motor, wherein the first hydraulic motor is connectable and disconnectable to/from said output shaft via a multi-disc clutch, and wherein the at least one second hydraulic motor is always connected to said output shaft, the stepless speed variation transmission drive unit being characterised in that it further comprises a multi-disc brake device which blocks rotation of the first hydraulic motor when said first hydraulic motor is disconnected from the output shaft.

2. The stepless speed variation transmission drive unit of claim 1, further comprising an intermediate shaft between said first input pinion and said output shaft, wherein the first input pinion is configured to transmit movement from the first input pinion to the output shaft via said intermediate shaft, and wherein the intermediate shaft is connected and disconnected from said output shaft via said multi-disc clutch.

3. The stepless speed variation transmission drive unit of claim 2, wherein the multi-disc clutch comprises a pack of discs coated with friction material interposed to a pack of metal counter-discs, the pack of discs being operatively connected in rotation to the output shaft, the pack of metal counter-discs being integral with the intermediate shaft, or vice versa, and wherein said clutch is controlled by a clutch actuator operated to make the pack of discs integral with the pack of metal counter-discs.

4. The stepless speed variation transmission drive unit of claim 2, wherein the multi-disc brake device acts on the rotation of the intermediate shaft.

5. The stepless speed variation transmission drive unit of claim 2, wherein the intermediate shaft supports, via a bearing system, an intermediate gear operatively connected in rotation to the output shaft.

6. The stepless speed variation transmission drive unit of claim 5, wherein the multi-disc clutch comprises a pack of discs coated with friction material interposed to a pack of metal counter-discs, the pack of discs being operatively connected in rotation to the output shaft, the pack of metal counter-discs being integral with the intermediate shaft, or vice versa, wherein said clutch is controlled by a clutch actuator operated to make the pack of discs integral with the pack of counter-discs, and wherein one between the pack of discs or counter-discs of the clutch is radially constrained to said intermediate gear.

7. The stepless speed variation transmission drive unit of claim 1, wherein said at least one second hydraulic motor is connected to a second input pinion configured to transmit movement from the at least one second hydraulic motor directly to the output shaft.

8. The stepless speed variation transmission drive unit of claim 1, wherein the clutch and the multi-disc brake device are operated by a clutch-brake actuator.

9. Transmission drive unit of claim 8, wherein at least the first input pinion, the output shaft, the multi-disc clutch, the multi-disc brake and the clutch-brake actuator are accommodated in and supported by a containment and support casing.

10. The stepless speed variation transmission drive unit of claim 1, wherein a first gear ratio between the first hydraulic motor and the output shaft is different from a second gear ratio between the at least one second hydraulic motor and the output shaft.

11. The stepless speed variation transmission drive unit of claim 1, wherein the multi-disc brake device is applied to the first input pinion and is operable via a brake actuator.

12. A stepless speed variation transmission drive unit, comprising: at least a first input pinion; at least a first hydraulic motor connected to said first input pinion; an output shaft; and at least a second hydraulic motor, wherein the first hydraulic motor is connectable and disconnectable to/from said output shaft via a multi-disc clutch, and wherein the second hydraulic motor is always connected to said output shaft; a multi-disc brake device which blocks rotation of the first hydraulic motor when said first hydraulic motor is disconnected from the output shaft; and an intermediate shaft between said first input pinion and said output shaft, wherein the first input pinion is configured to transmit movement from the input pinion to the output shaft via said intermediate shaft, and wherein the intermediate shaft is connected and disconnected from said output shaft via said multi-disc clutch;

wherein the multi-disc clutch comprises a pack of discs coated with friction material interposed to a pack of metal counter-discs, the pack of metal discs being operatively connected in rotation to the output shaft, the pack of metal counter-discs being integral with the intermediate shaft, or vice versa, and wherein said clutch is controlled by a clutch actuator operated to make the pack of discs integral with the pack of counter-discs; and wherein said clutch actuator is of the hydraulically or pneumatically-operated type.

13. The stepless speed variation transmission drive unit of claim 12, wherein said clutch actuator comprises a piston-cylinder system, wherein the piston is composed of a flange made on the intermediate shaft, and wherein the cylinder is sealingly assembled around said flange so as to define therewith a front cylinder chamber and a rear cylinder chamber, said front and rear chambers being supplied alternately by a pressurised fluid so as to command the cylinder to translate axially between an advanced position of compression of the packs of discs and counter-discs and a rearward disengaged position of the discs from the counter-discs.

14. The stepless speed variation transmission drive unit of claim 13, wherein the multi-disc brake device is operated by a cylinder of the clutch actuator.

15. The stepless speed variation transmission drive unit of claim 14, wherein the multi-disc brake device comprises a pack of brake discs coated with friction material, interposed to a pack of metal counter-brake discs, said brake discs being pressed against said counter-brake discs by the cylinder of the clutch actuator when said cylinder is in a rearward position.

16. The stepless speed variation transmission drive unit of claim 15, wherein the pack of metal counter-discs is radially integral with the intermediate shaft, and wherein the pack of brake discs is radially integral to a static part of the stepless speed variation transmission drive unit, or vice versa.

17. A stepless speed variation transmission drive unit, comprising at least a first input pinion, at least a first hydraulic motor connected to said first input pinion, an output shaft, and at least a second hydraulic motor, wherein the first hydraulic motor is connectable and disconnectable to/from said output shaft via a multi-disc clutch, and wherein the second hydraulic motor is always connected to said output shaft, the transmission drive unit being characterised in that it further comprises a multi-disc brake device which blocks rotation of the first hydraulic motor when said first hydraulic motor is disconnected from the output shaft;

wherein the clutch and the multi-disc brake device are operated by a clutch-brake actuator; and wherein said clutch-brake actuator is movable between a first brake position, in which it operates the multi-disc brake device and is simultaneously disengaged from the clutch and a second clutch position, in which it releases the multi-disc brake device and simultaneously operates the clutch.

* * * * *